United States Patent [19]

Snyder

[11] Patent Number: 5,222,852
[45] Date of Patent: Jun. 29, 1993

[54] QUICK RELEASE CLIP-IN-GROMMET FASTENER PERMITTING LIMITED SLIDING MOVEMENT BETWEEN OBJECTS FASTENED THEREBY

[75] Inventor: Mark D. Snyder, Clawson, Mich.

[73] Assignee: Nissan Research & Development, Farmington Hills, Mich.

[21] Appl. No.: 854,925

[22] Filed: Mar. 20, 1992

[51] Int. Cl.⁵ .............................................. F16B 21/00
[52] U.S. Cl. ...................................... 411/553; 411/44; 411/182
[58] Field of Search ........................ 411/44, 45, 15, 57, 411/349, 549, 553, 508, 500, 907, 908, 182; 24/297, 607, 453

[56] References Cited

U.S. PATENT DOCUMENTS

| | | |
|---|---|---|
| D. 247,801 | 5/1978 | Bulanda et al. . |
| 2,943,373 | 7/1960 | Rapata . |
| 2,946,612 | 7/1960 | Ahlgren . |
| 3,038,747 | 6/1962 | Rapata . |
| 3,386,757 | 6/1968 | Forward ............................ 411/182 |
| 3,854,173 | 12/1974 | Barnett . |
| 3,964,364 | 6/1976 | Poe ...................................... 411/15 X |
| 4,580,322 | 4/1986 | Wright et al. . |
| 4,647,262 | 3/1987 | Yokota ................................ 411/44 |
| 4,699,539 | 10/1987 | Chen . |
| 4,762,437 | 8/1988 | Mitomi . |
| 4,865,505 | 9/1989 | Okada . |
| 4,927,306 | 5/1990 | Sato . |
| 4,948,314 | 8/1990 | Kurosaki ............................ 411/182 |

FOREIGN PATENT DOCUMENTS

| | | |
|---|---|---|
| 1306092 | 9/1962 | France ................................. 411/45 |
| 1179924 | 2/1970 | United Kingdom . |
| 1519357 | 7/1978 | United Kingdom . |
| 1588556 | 4/1981 | United Kingdom . |

OTHER PUBLICATIONS

Du Pont product brochure titled "Typical Processing Conditions for Du Pont Engineering Plastics", Jan. 1987.
Du Pont product brochure titled "GRZ Du Pont Glass Reinforced Zytel Nylon Resin Molding Guide", Mar. 1989.
Du Pont product brochure titled "MINLON Engineering Thermoplastic Resins Molding Guide", May 1989.
Hoechst Celanese product brochure titled "Engineering Plastics Division Celanese Nylon 6/6", 1990.
8-page Japanese language compilation of disclosures from relevant Japanese patents identified in Japanese by the title "Ko Cha Ku". It illustrates assorted fastener structure details. Published Sep. 25, 1980.

Primary Examiner—Rodney M. Lindsey
Attorney, Agent, or Firm—Lowe, Price, LeBlanc & Becker

[57] ABSTRACT

A fastening system is provided which includes an elongate grommet affixable into a correspondingly shaped aperture in a first object to be retained therein, and a clip passed through an aperture in a second object to be fastened to the first object. The two objects, one with the grommet affixed therein and the other with the clip projecting therethrough are brought together and, in a first orientation of the clip with respect to the grommet the clip is forcibly pressed into the grommet, whereupon a pair of claws formed onto the shank of the clip engage in an interference fit with recesses formed for such engagement into opposite walls of the grommet. The clip has a maximum transverse dimension smaller than an inside dimension of the elongate grommet, so that a predetermined amount of relative motion between the fastened objects is permitted by sliding motion of the clip while in interference engagement with the grommet.

17 Claims, 5 Drawing Sheets

QUICK RELEASE CLIP-IN-GROMMET FASTENER PERMITTING LIMITED SLIDING MOVEMENT BETWEEN OBJECTS FASTENED THEREBY

FIELD OF THE INVENTION

This invention relates to a system for fastening two substantially flat objects to each other quickly and detachably, and more particularly to a clip-in-grommet fastener by which two substantially flat objects may be quickly attached to or detached from each other with limited sliding movement permitted between the fastened objects in use.

BACKGROUND OF THE PRIOR ART

There are many applications, for example in assembling a variety of substantially flat parts such as sheet metal elements, panels, flanges and the like, in a typical automobile. Some locational tolerance or deliberately provided sliding movement between the fastened parts is sometimes desirable. Elements for providing such fastening should be easy and inexpensive to manufacture and assemble in the finished product.

Subsequent to manufacture and sale to the ultimate purchaser, an automobile may see service for a long time before maintenance and/or repair needs require temporary disassembly of the fastened parts. Unless it is designed appropriately, a person seeking to disassemble the fastening system will encounter problems, e.g., elements may have rusted in place, or water leakage may have caused corrosion and materials deterioration. The typical automobile often is also exposed to significant changes in temperature, humidity, and operational stresses. Therefore, unless the fastening system inherently possesses a certain controlled amount of give or tolerance, the initially correctly assembled parts will very likely be unduly stressed, possibly warped, and difficult to reassemble upon completion of whatever repairs required their disassembly.

Highly economical and efficient fastening systems are known wherein one element is easily located in or affixed to one of the substantially flat parts to be fastened. The other part to be fastened is then placed in a predetermined relationship therewith and a second element of the fastening system is employed to obtain the desired engagement. The actual act of fastening the elements of the fastening system may involve engagement of threads, deformation of expandable segments of the elements of the fastening system, and assorted combinations of twisting, turning and clipping actions.

An example of a known fastening system is taught in British Patent No. 1,588,556, to Shilson, titled "Turn Release Fastener", which employs a quick release stud releasable from a socket by rotation of the stud by a quarter turn. The socket in the system is formed to have a pair of opposed and parallel abutments resiliently biased toward one another and arranged to receive the stud, and is previously attached to one of the substantially flat parts which are to be fastened together. The stud has a partially spherical head provided with a recess for engagement by a turning tool, a straight cylindrical shaft portion and a head portion having a leading end for entering between the abutments. During use, the stud is engaged with the socket by entry of the leading end of the shank of the stud between the amendments, forcing the abutments apart until shoulders provided thereon have been passed through, the abutments thereafter resiliently closing to enter into recesses provided for retention of the stud within the socket. The socket is stamped and formed from a single piece of metal.

British Patent No. 1,519,357, to Wright, titled "Improvements Relating to Fasteners" teaches a fastening system in which a one-piece receptacle includes a pair of clip-like legs, the free ends of which extend toward one another for engagement with depressions or grooves formed in the shank of a complementary stud to retain it once it is pushed into the receptacle. The receptacle is previously attached to one of the substantially flat parts that are to be engaged together, and the stud passes through the other of such parts. The receptacle is preferably formed from spring steel. The stud has a flat domed head, including a recess to receive a tool such as a screw driver, and a shank which includes a first cylindrical part and a second larger diameter cylindrical portion having flat tapering surfaces which converge to form a waist. The end of the stud removed from the head has a generally conical tapered portion including flat chamfered surfaces. The stud is retained within the receptacle by a resilient washer.

Numerous other fastening systems are known and used but none of them provide exactly the right combination of economy, ease of installation and use and, most importantly, a predetermined degree of tolerance or freedom of relative movement for the fastened parts to accommodate the needs of workers assembling the product initially and persons seeking to temporarily unfasten the fastened parts to access other elements located behind the fastened parts or to perform repairs thereon, and finally to allow fastener components to expand and contract with changing temperature.

Accordingly, there is a definite need for a simple, inexpensive, easily installed, readily engageable and disengageable fastening system for fastening together two substantially flat parts with a built-in tolerance or freedom of relative movement therebetween in a selected direction.

SUMMARY OF THE INVENTION

It is a principal object of the present invention to provide a simple, inexpensive, fastening system which enables secure but selectively releasable engagement of two substantially flat parts.

It is a related object of this invention to provide an inexpensive fastening system for securely fastening two substantially flat parts to each other with a predetermined amount of relative movement available between the fastened parts in a selected direction.

It is a further related object of this invention to provide a two-part fastening system, wherein one of the parts is readily attachable to one of two substantially flat elements which are to be fastened together, with a readily releasable element which securely holds the fastened parts together with a predetermined degree of relative movement permitted therebetween in a selected direction, and which can be very easily unfastened even after passage of a substantial period of time with a simple conventional tool such as a screw driver.

These and other related objects of this invention are realized by providing a fastening system for releasably but securely fastening together two substantially flat parts, the system comprising:

a grommet formed of an elastic material, having a pocket-like body with an opening leading into an inside space of oblong cross-section, the grommet having an outer surface formed to be retained to a first object and an inside surface comprising a pair of recesses disposed above oppositely tapering surfaces inclined toward each other at a bottom portion of the inside space to a predetermined minimum first separation distance in an unstressed state; and a clip having a head and an elongate shank, the shank having a distal end portion of rectangular varying cross-section defined by intersections between two parallel planes spaced apart by a second separation distance larger than the minimum first separation distance and a pair of plane surfaces inclined toward each other to a distal end of the clip to a third separation distance which is smaller than the minimum first separation distance, and a pair of claws disposed intermediate the head and the distal end portion for engagement with the recesses in the grommet.

In another aspect of the invention, there is provided a fastening system comprising:

a clip comprising a first material, formed about a longitudinal axis of symmetry contained within a clip principal plane of symmetry, having a head and an elongate shank extending along the axis of symmetry, wherein the head is formed to receive a rotational torque, and wherein the shank has an outer surface defined in part by a pair of parallel plane surfaces which are symmetrically disposed with respect to the axis of symmetry at a separation "w" and are orthogonal to the clip principal plane of symmetry, the pair of parallel plane surfaces extending from the head to a rounded distal end of the clip, another part of the outer surface of the shank comprising portions of a cylindrical surface of a diameter "$d_1$" about the axis of symmetry, wherein "$d_1$" is larger than "w", the shank having a cross-section of reduced diameter "$d_2$" intermediate the head and the distal end to provide a pair of claws extending between the diameters "$d_1$" and "$d_2$" and to a first predetermined distance from the distal end, the shank having a narrowing tapered length extending from a first level beyond the claws to the rounded distal end, the tapered length having a rectangular cross-section defined by intersections between the pair of parallel plane surfaces and a pair of side surfaces inclined symmetrically about the clip principal plane of symmetry; and a grommet comprising a second material, having a grommet principal plane of symmetry containing an axis of symmetry, comprising a body having a wall of varying thickness and formed as a pocket with a distal rounded closed end and an oblong opening having both a length "c" and a width "$x_1$" which are respectively larger than "$d_1$", the opening being surrounded by an annular flange extending generally transversely away from the axis of symmetry, wherein opposing principal inside wall surfaces of said grommet have portions formed to be oriented generally along the grommet principal plane of symmetry have recesses of predetermined depth and width extending adjacent to and along the flange, wherein the opposing principal inside wall surfaces taper inwardly toward the grommet principal plane of symmetry to a separation "$x_2$" which is less than "$d_1$" but greater than "$d_2$" and then continue in parallel to a predetermined notch level and then abruptly widen symmetrically to a separation "$x_3$" and continue in parallel thereafter for a predetermined notch length to define a grommet notch extending to a point which is at a second predetermined distance above the lowest point of the inside of the grommet body, said grommet notch having a length longer than an axial length of the claws of the clip, the principal inside wall surfaces of the grommet then turning sharply inwardly toward the grommet principal plane of symmetry and thereafter continuing in planar portions symmetrically inclined about the axis of symmetry to the rounded closed end of the grommet at an inclination of the inside wall surfaces of the grommet corresponding to corresponding inclinations of the tapered length of the clip, but with the closest separation between the inclined inside wall surfaces of the grommet being a distance "$x_4$" which is less than "w" but greater than "$d_4$", and wherein the separation between the grommet notches and the inside surface at the grommet bottom is longer than the separation between the clip claws and the clip distal end.

DESCRIPTION OF THE PREFERRED EMBODIMENTS

Figure 1:
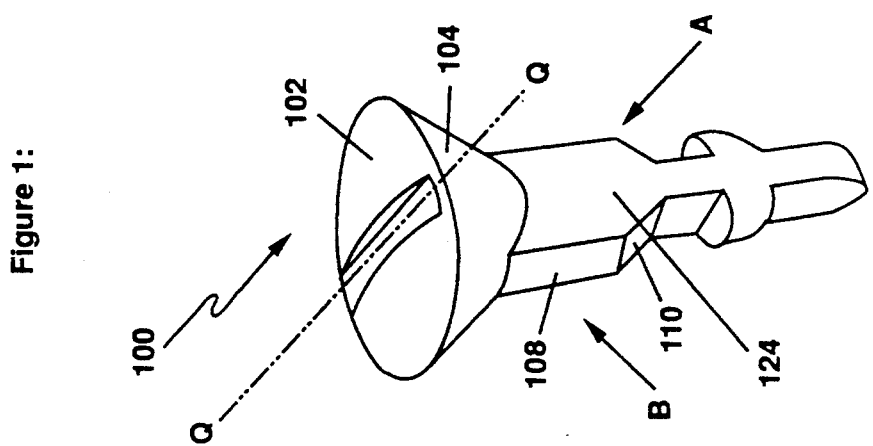
FIG. 1 is a perspective view of a clip element of a clip-in-grommet fastening system according to a preferred embodiment of this invention.

As best seen in FIG. 1, clip 100 is a one-piece element, preferably formed of a resinous material although it could also be made of other materials, e.g., a metal. If clip 100 is to be utilized where it may be exposed to ambient moisture, water leakage or the like, it may be provided with a rust proof or anti-corrosive coating. It is important that clip 100 have relatively smooth surfaces and non-sharp edges. If it is made of a metal, it may need to be deburred to ensure that sharpness at its edges has been removed.

Clip 100 has a longitudinal axis of symmetry P—P and generally comprises a head and a shank. The head in the preferred embodiment has a partially spherical portion 102 of diameter "D" and a conical portion 104 tapering to the adjacent shank portion of diameter "$d_1$". To facilitate controlled forced turning of clip 100, curved portion 102 is provided with a selectively shaped recess 106. In the preferred embodiment per FIGS. 1 and 2, recess 106 has the form of a slot into which the blade end of a conventional screwdriver may be inserted to apply a torque.

Figure 2:
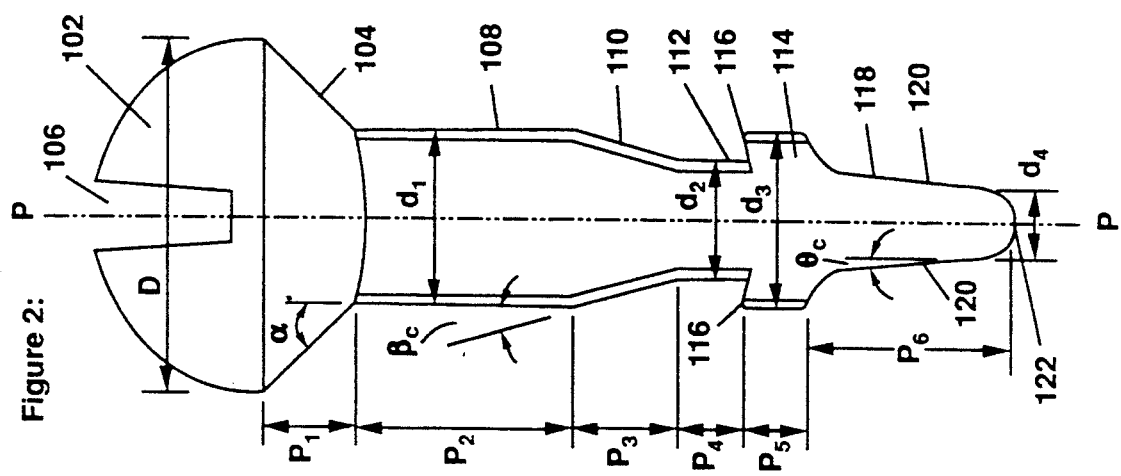
FIG. 2 is a side elevation view of the clip of FIG. 1 as viewed in the direction of arrow "A" in FIG. 1.

As indicated in FIG. 2, conical portion 104 of the head of clip 100 is tapered at an angle "$\alpha$" with respect to axis P—P. In the preferred embodiment, $\alpha$ is selected to have a value of approximately 50°. In principle, however, $\alpha$ may be selected to have any convenient value and may even be made 90°, i.e., the conical portion 104 may be reduced to a flat plane. In the embodiment of FIG. 2, conical portion 104 at a small diameter "$d_1$" merges into the shank portion of clip 100. In the embodiment illustrated in FIG. 2, the height of conical portion 104 in the direction of axis P—P is "$p_1$".

As best seen in FIG. 2, looking in the direction of arrow "A" per FIG. 1, partially cylindrical shank portion 108 is seen to have a maximum diametral dimension "$d_1$" and a reduced transverse dimension "$w_1$" corresponding to a pair of extended parallel flat surfaces 124, 124, as best understood with reference to FIGS. 1 and 2. Shank portion 108 has a length "$p_2$", and continues into a tapered portion 110, which has an outer surface that is partially conical, reducing to a smaller diameter "$d_2$" over a length "$p_3$". Tapered portion 110 is also partly defined by a continuation of the same flat surfaces 124, 124 as partially define partially cylindrical portion 108.

The shank then continues into a relatively short partially cylindrical portion 112 of length "$p_4$" having an outer surface comprising two partially cylindrical portions of diameter "$d_2$" and continuations of the same flat surfaces 124, 124 as partially defined earlier-described shank portions 108 and 110.

Shank portion 112 continues into yet another partially cylindrical portion 114, of length "$p_5$" which is partially defined by a pair of partially cylindrical surfaces of diameter "$d_3$" and the same pair of flat surfaces 124, 124 which partially defined the preceding shank portions 108, 110 and 112.

The changeover from shank portion 112 to shank portion 114 incorporates two symmetrically disposed claws 116, 116, as best seen in FIG. 2. As previously noted, clip 110 is formed to avoid having sharp edges, hence as indicated in FIG. 2, claws 116, 116 have relatively smooth, i.e., non-sharp, extremities.

Shank portion 114 continues to a clip end portion 118 by first reducing somewhat abruptly to a straight sided tapered length between a pair of symmetrically disposed plane faces 120, 120, each of which is symmetrically inclined at an angle "$\theta_c$" with respect to axis P—P, as best seen in FIG. 2. Clip 110 ends in a generally rounded tip 122 so that the tapered end portion 118 has a length "$p_6$".

Figure 3:
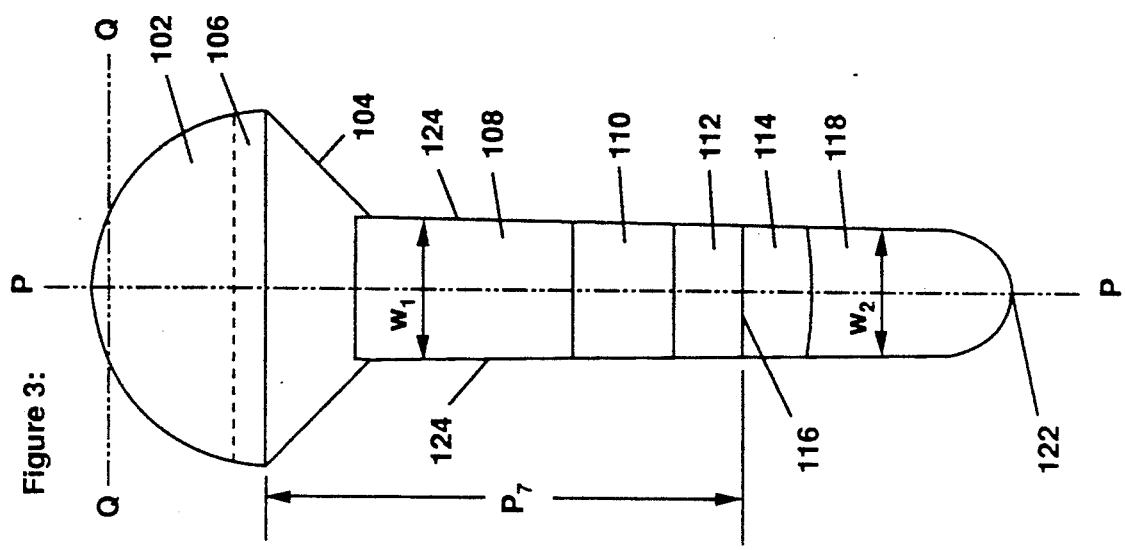
FIG. 3 is a side elevation view of the clip of FIG. 1 as viewed in the direction of arrow "B" in FIG. 1.

For convenience of reference, the pair of plane surfaces 124, 124 which extend from the end of tapered portion 104 almost tot he generally rounded tip 122 are to be understood as normal to a second reference axis Q—Q which is orthogonal to the first reference axis P—P of clip 100, as best understood with reference to FIGS. 1 and 3. Arrow "A" is parallel to axis Q—Q as best seen in FIG. 1, and slot 106 is symmetrical about axis Q in its elongate direction. The plane of intersection of axes P—P and Q—Q will be referred to as the principal plane of clip 100.

For convenience, the clip length from the largest diameter of conical portion 104 of its head and extending to the tips of claws 116, 116 is identified as "$p_7$", as best seen in FIG. 3.

Clip P is utilized in combination with a grommet 200 which is preferably made of a tough plastics material which can be readily formed by known techniques, e.g., by conventional molding processes, to have fairly precise dimensions and hard smooth surfaces. The plastics material selected for grommet 200 must be tough and hard to avoid scratching or tearing in the process of repeatedly engaging and/or disengaging with clip 100. As previously noted, clip 100 is formed to have no sharp edges because the present invention requires forcible engagement between portions of the clip 100 and certain surfaces of grommet 200. The plastics material of which grommet 200 is formed must also be rough under all anticipated conditions of use, e.g., the full range of expected ambient temperatures, ranging from arctic cold to desert heat, without weakening. A preferred material for forming grommet 200 is nylon, although other plastics materials having the desired qualities may be utilized, e.g., actual.

Figure 4:
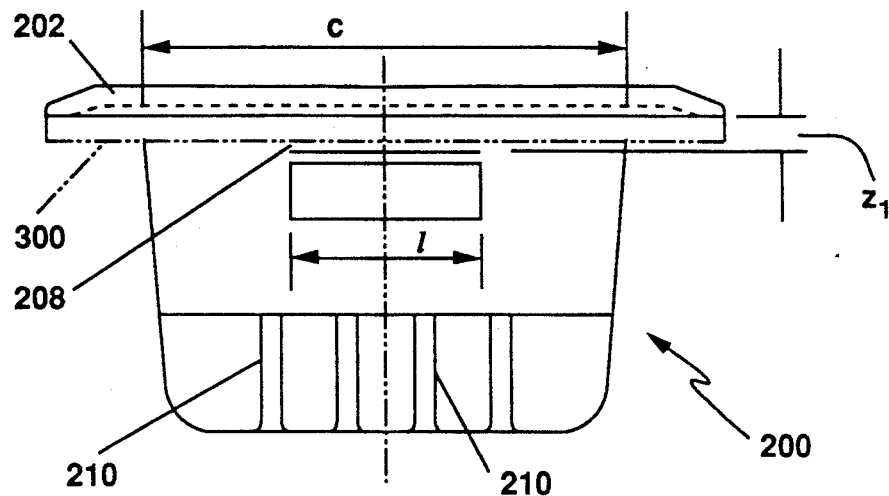
FIG. 4 is a side elevation view of a grommet of the clip-in-grommet fastening system according to the preferred embodiment of this invention, with a grommet washer indicated in phantom lines.
Figure 5:
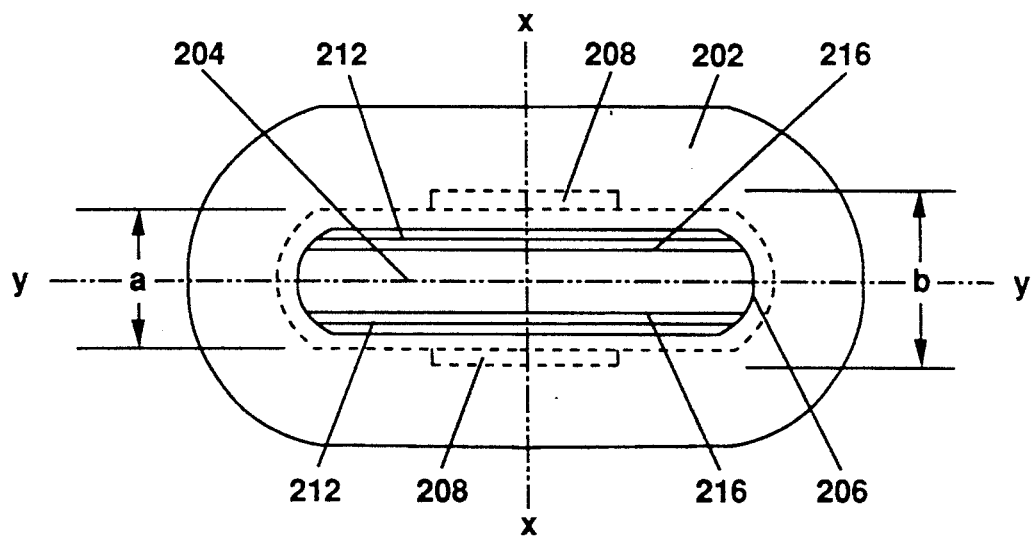
FIG. 5 is a plan view of the grommet of FIG. 4.

The preferred form of grommet 200 is illustrated in a principal side elevation view in FIG. 4 and in plan vie in FIG. 5. Certain important details of the shape and size at the inside surface of grommet 200 are best understood by reference to the cross-sectional view thereof in FIG. 8.

Figure 6:
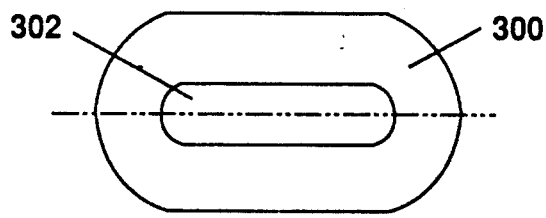
FIG. 6 is a plan view of a grommet gasket for use with the grommet of FIG. 4.
Figure 7:
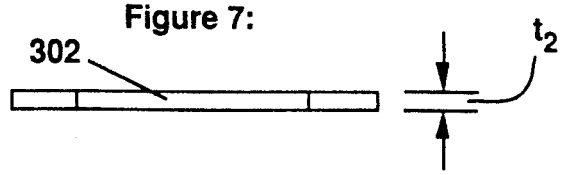
FIG. 7 is a side elevation view of the grommet of FIG. 6.

It is anticipated that for most practical uses of this invention, grommet 200 will be utilized with an elastic washer 300 which is shown in plan and side elevation views, respectively, in FIGS. 6 and 7, and in phantom lines in FIG. 4.

Referring now to FIG. 4, grommet 200 has the general form of an open pocket with a flange surrounding its opening. This is only a general description, and specific structural aspects of tis form are described more fully in the following paragraphs. The inside and outside surfaces defining the structure of grommet 200 preferably are smoothly contiguous with each other.

Grommet 200 has at an open end an outwardly extended flange portion 202, preferably with a slight turn-in at the outermost edge portions, and conveniently having a generally oblong shape defined by an outer boundary comprising two parallel straight portions contiguous with two curved end portions as best understood with reference to FIG. 5. Such a shape is only preferred and is not restrictive, i.e., the flange portion may have other shapes for particular uses. Flange 202 has a generally annular shape and continues smoothly into the inside of the pocket-like cavity 204 inside the body of grommet 200 through opening 206.

In the following description, for ease of visualization, flange 202 of the grommet is referred to as being at the top, i.e., the rest of the body is disposed therebelow. Also, for convenience of reference, a Cartesian coordinate system, comprising a vertical axis Z—Z disposed at the center of the grommet, as best understood with reference to FIG. 8, may be visualized in such a reference system of Cartesian coordinates, the other two axes X—X and Y—Y, being oriented as best understood with reference to FIG. 5. The plane defined by the intersection of axes Z—Z and Y—Y will be referred to as the principal plane of grommet 200. Various dimensional relationship will then be understood more readily.

At a predetermined distance "$z_1$" below the lowest point on flange 202 in its unstressed state, on the outer surfaces of both principal sides of grommet 200, are provided straight horizontal shoulders 208, 208, each of a length "1" along the Y—Y direction, as best understood with reference to FIG. 4. The outer surfaces of grommet 200 immediately above shoulders 208, 208, in their unstressed state are separated by a distance "a", and the shoulders themselves extend outwardly so that the distance between their outermost edges is "b", as best understood with reference to FIG. 5. The outer surfaces of the principal walls of grommet 200, i.e., the walls substantially along the principal plane, then taper downward to blend into substantially parallel portions separated from each other by a distance approximately equal to "a" in their unstressed state. This is best understood by reference to FIG. 8. The outer surfaces of the principal sides of grommet 200 then extend inwardly toward the plane of intersecting axes Y—Y and Z—Z and blend into a rounded bottom portion.

Figure 8:
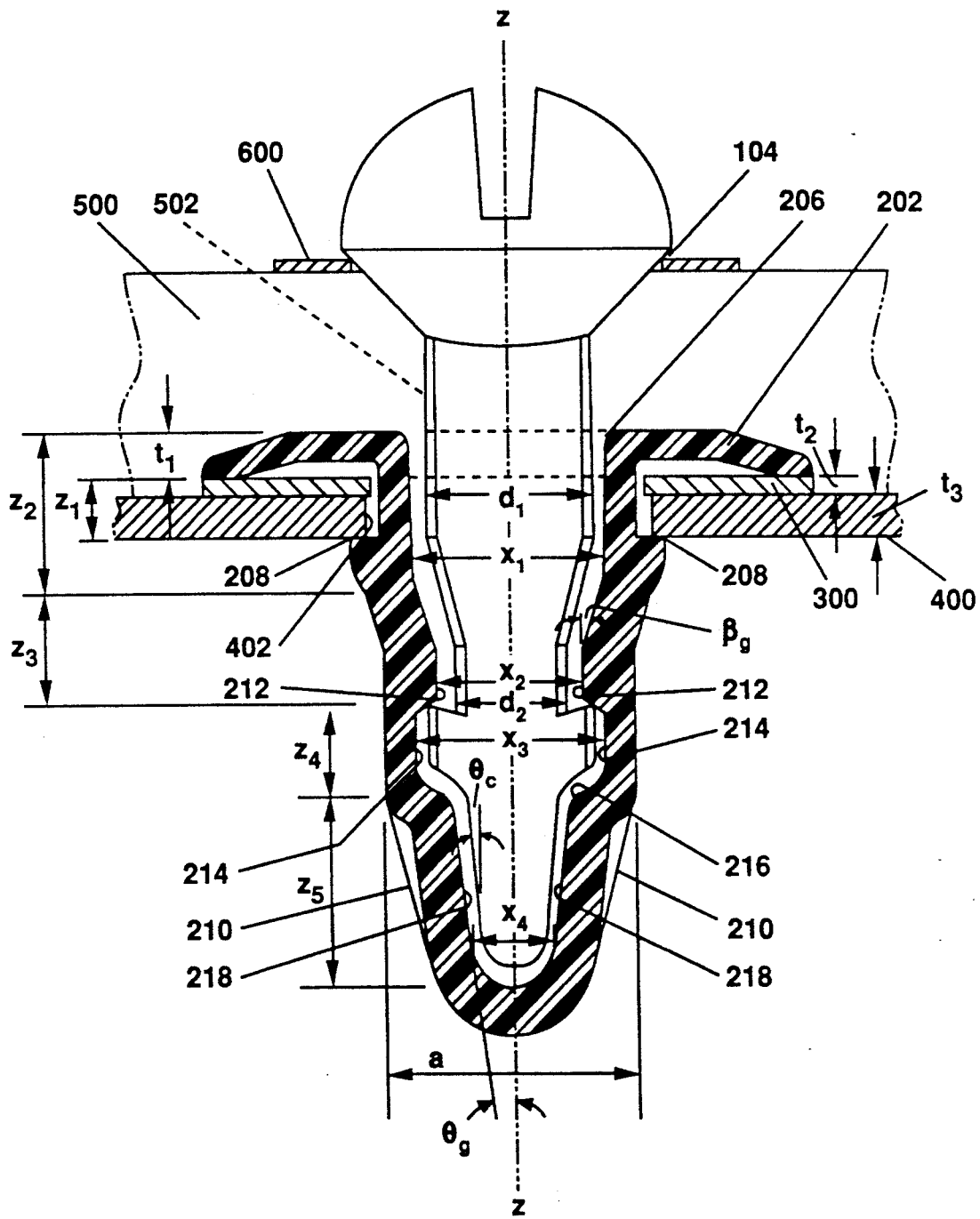
FIG. 8 is a partially sectioned view illustrating the clip and grommet of FIGS. 1 and 4 in use to fasten together two substantially flat parts, the clip being illustrated in the same orientation as in FIG. 2.

In this region, just above the bottom end on the outside of the principal forces, there are optionally provided a plurality of vertical reinforcement ribs 210, preferably symmetrically disposed in even numbers on opposite sides of the principal plane of the grommet 200. These reinforcement ribs 210, 21 are best seen in FIGS. 4 and 8. Their presence provides additional stiffness and strength to the principal walls of grommet 200 where they are most likely to be stressed in forcible interaction with correspondingly disposed end portions of clip 100 curing engagement and disengagement.

As indicated in FIGS. 4, 6, 7 and 8, an elastic, compliant washer 300, shaped and sized to fit annularly around the body of grommet 200 immediately below flange 202, is employed partly to seal the grommet at its use location and partly to absorb some of the deformation force involved in fitting the grommet to one of the two parts that are to be connected by the clip-in grommet system of this invention. Washer 300 has a generally oval hole 302 formed therein of a shape and size, best understood with reference to FIG. 8, as can be comfortably slipped over the body of grommet 200 to be fitted beneath flange 202 thereof.

Important structural aspects of the inside surface of grommet 200 will now be described. First, past the hole 206 at the top of flange 202, the inside surface has a generally oval shape and comprises two principal substantially parallel vertical plane surfaces which join each other at curved end surfaces. The net effect is to provide an elongate oval opening 206 leading into the cavity 204, as best seen in FIG. 5. The two principal inside plane surfaces of this part of grommet 200 are separated in the direction of axis X—X by a distance "$x_1$", and have a depth "$z_2$" which is greater than the some of the lengths "$z_1$" and the overall thickness "$t_1$" of flange 202 between its uppermost and lowermost parts in its unstressed state. The inside principal surfaces of grommet 200 then taper towards each other at an angle preferably about the same as the angle "$\theta_c$" of clip 100, as best understood with reference to FIGS. 2 and 8. The principal inside wall surface portions 212, 212 then have a relatively short expanse in which they are parallel to each other and separated by a distance "$x_2$" and end at a distance "$z_3$" below the points at which the parallel surfaces separated by the distance "$x_1$" end.

The principal inside surfaces of grommet 200 then project away from the principal plane of the grommet to a point where they are separated by a distance "$x_3$" and continue as two surface portions 214, 214 parallel to each other and separated by this distance for a length approximately "$z_4$". This is best understood with reference to FIG. 8, from which it is seen that there is thus created a pair of elongate opposed notch portions or recesses in the inside surface of grommet 200 to engage with and retain claws 116, 116 of clip 100. The principal inside surfaces of grommet 200 then approach each other smoothly as surface portions 216, 216, blending into a pair of opposed plane surface portions 218, 218 respectively inclined at an angle "$\theta_g$" to the principal plane of the grommet and eventually meet in a curved inside bottom surface. The total distance from the bottom of the notches just described to the inside bottom of grommet 200 is "$z_5$". As will be appreciated from a review of FIG. 8, the plurality of reinforcement ribs 210 are disposed along the outer surface of grommet 200 in this region, i.e., outside surface portions 218, 218.

During its use, the grommet 200 is pressed into an aperture 402 of suitable shape and size formed in a first substantially flat part 400. This aperture must have a length larger than the span "c" of the body portion of grommet 200 along the Y—Y axis, and a width greater than the distance "a" but smaller than the distance "b", as best understood with reference to FIG. 5. Thus, when the grommet 200 is pressed into aperture 402, due to the outside inclined surfaces immediately below shoulders 208, 208, the principal sides of the grommet will initially deform inward and shoulders 208, 208 of the grommet will slip into aperture 402 and then immediately expand elastically outward to engage with edge portions of the aperture 402 in flat part 400. See, for example, FIG. 8.

As previously indicated, an elastic washer 300 may be disposed immediately between flange 202 and the adjacent surface of substantially flat part 400. As will be understood, because grommet 200 is made of a plastics material that is strong and elastically deformable, by suitable choice of dimensions "$t_1$", "$t_2$" and "$t_3$", there will be some deformation of washer 300 and some deformation of flange 202 to create a snug elastic fit of grommet 200 to part 400 at aperture 402. The grommet 200 is thus located in place in one of the two parts that are to be engaged by the clip-in-grommet device according to this invention.

The other substantially flat part 500 which is to be engaged to the first substantially flat part 400 is shown generally in phantom lines in FIG. 8. For reference purposes only, the thickness of flange 202, when installed with a washer 300 into an aperture of the first substantially flat part 400 is "$t_1$". The thickness of washer 300 is assumed to be virtually "$t_2$", i.e., it is assumed that it is not significantly squashed. The thickness of the first substantially flat part 400 is identified as "$t_3 38$". The thickness of the second substantially flat part 500 is then determined by the lengthwise dimensions of clip 100, depending on whether or not a thin optional washer 600 is employed as indicated in FIG. 8.

The following dimensional relationships must be satisfied, taking into account the fact that grommet 200 itself has some elastic deformability in all directions and that the second substantially flat part 500 may also be capable of sustaining some elastic or inelastic deformation in use.

For the clip:

$d_1 = d_3 > d_2 > d_4$ (see FIG. 2);

$w_1 = w_2$ (because surfaces 124, 124 are parallel);

$d_1 > w_1$ (or $w_2$); and $\alpha$ preferably $\approx 50°$.

For the crommet:

$x_1 = x_3 > x_2 > x_4$ (see FIG. 8).

Clip 100 vis-a-vis crommet 200:

$x_1 > d_1$;

$x_2 > d_2$;

$x_3 > d_3$;

$x_4 > d_4$;

$(p_1 - p_2) > (z_2 + z_3)$ (see FIGS. 2 and 8);

$(z_4 + z_5) > (p_5 + p_6)$;

$\theta_c \approx \theta_g$; and $\beta_c \approx \beta_g$.

As shown in FIG. 8, clip 100 according to the preferred embodiment has a slot-like recess 106 formed in its head and this slot is oriented symmetrically about the principal plane of the clip and is perpendicular to the flat planar faces 124, 124. This is best understood by reference to FIGS. 1, 2 and 3. Given this structure, clip 100, with or without the optional thin washer 600, can be forcibly pressed into an aperture 502 formed to receive the same in the second substantially flat part 500.

Clip 100 must then be oriented so that slot 106 and the principal plane of clip 100 are both parallel to the principal plane of grommet 200 and can then be readily pressed therein. This is how fastening engagement is effected.

As will be appreciated from FIG. 8, the relatively narrow tip end portion 118 of tip 110 will enter readily; however, entry of the next portion 114 of width "$d_3$" will cause temporary outward elastic deformation of the initially unstressed portion of width "$x_2$" of the grommet. Since clip 100 is formed to have non-sharp edges and surfaces, and since the material of grommet 200 is selected to be tough, elastic and relatively hard at smooth surfaces., this forcible intromission of clip 100 into grommet 200 can be effected with only a moderate amount of force. Eventually, claws 116, 116 of clip 100 will slide past the construction defined by surfaces 212, 212 and reach the notched portions or recesses defined by surfaces 214, 214 separated by a distance "$x_3$" greater than the width "$d_3$" of clip 100. Clip 100, at this point, will be engaged in an interference fit with grommet 200.

It should be noted that the inside span along the direction of axis Y—Y of space 204 in grommet 200 is considerably larger than diameter "$d_1$" or "$d_3$" of clip 100. Consequently, with the tapered flat faces 120, 120 of clip 100 being prevented from unintended rotation by their close and slidable disposition next to similarly inclined inside plane surfaces 218, 218 of grommet 200, clip 100 may slide along the direction of axis Y—Y while remaining in interference fit engagement with the grommet. Under these circumstances, the first and second substantially flat parts 400 and 500 will remain in engagement with each other with some movement therebetween permitted in the direction of axis Y—Y.

The lower portion 118 of clip 100 has a downwardly tapering length, and everywhere a rectangular cross-section having a constant length "$w_2$" always greater than its thickness varying between "$d_2$" and "$d_4$", as best seen in FIGS. 2 and 3.

It now remains only to describe how clip 100 may be easily disengaged from grommet 200 by the provision of a torque applied via recess 106 to clip 100.

Figure 9:
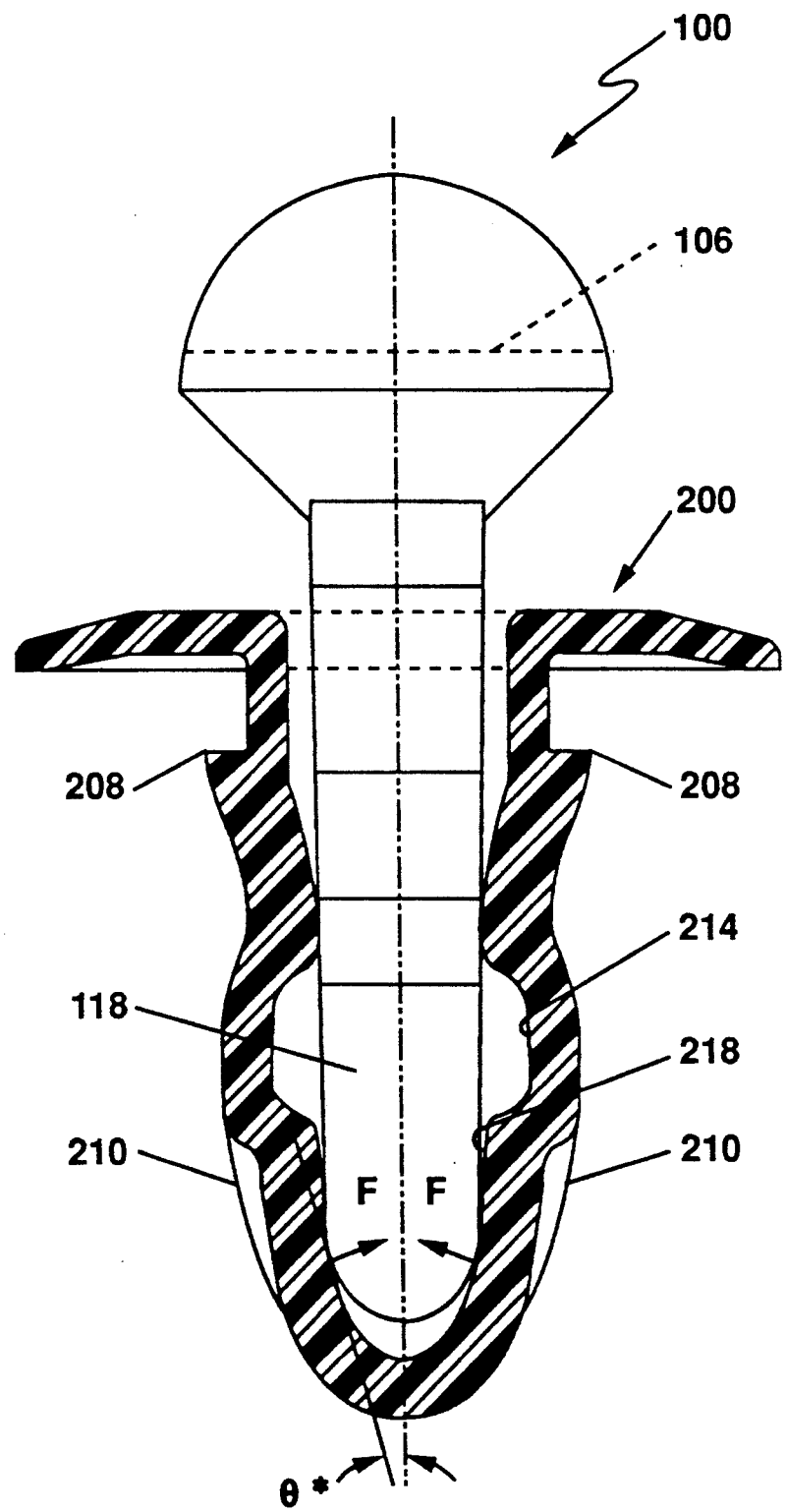
FIG. 9 is a partially sectioned view of the clip and grommet, wherein the clip is shown in the same orientation as in FIG. 3 and is in a position to which it must be rotated to be put in a condition to be popped out of the grommet for disengagement therefrom.
Figure 10:
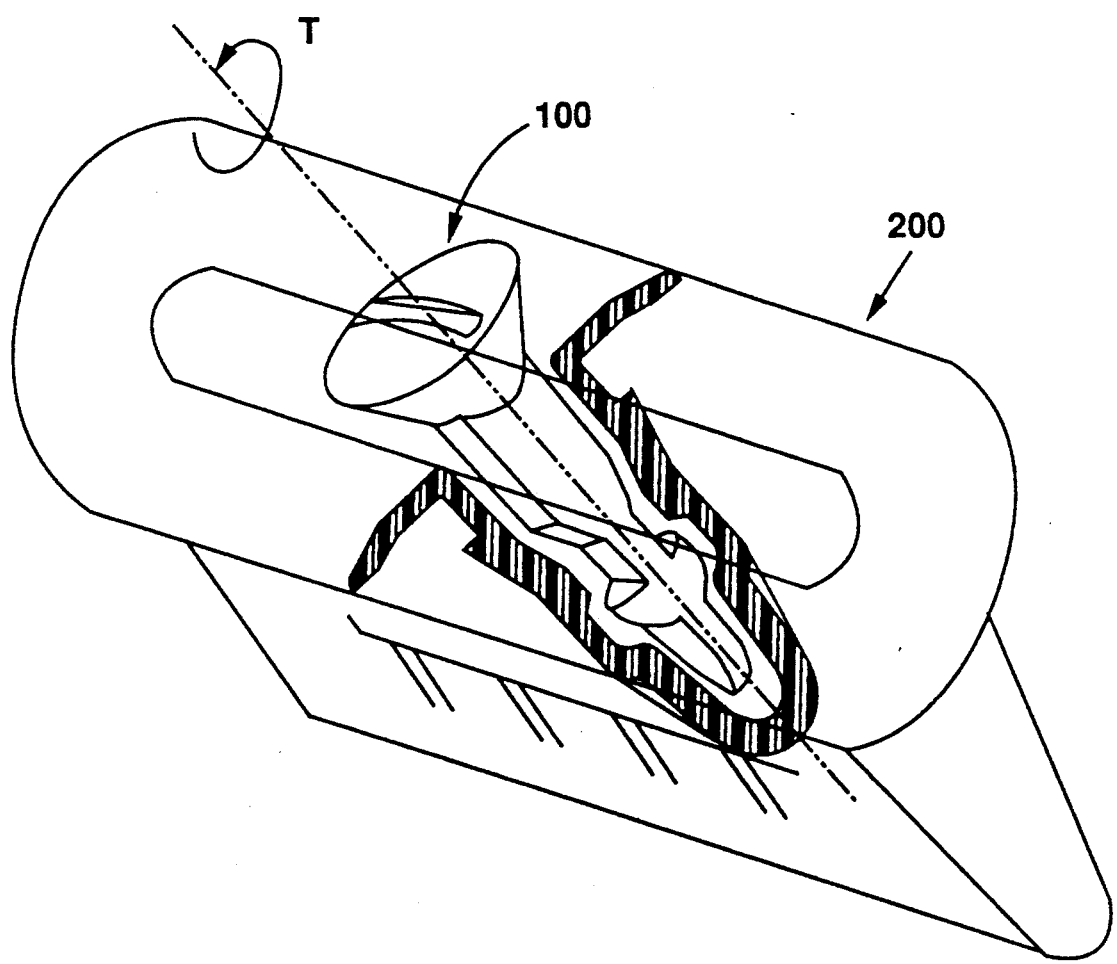
FIG. 10 is a partially sectioned perspective view of the clip and grommet according to the preferred embodiment of the invention, to illustrate the manner in which the clip must be rotated from its engaged position to obtain disengagement and pop-out release from the grommet.

As best seen with reference to FIGS. 9 and 10, when such a torque is applied about axis P—P to clip 100, rotation of the lower part 118 of clip 100 will cause it to forcibly contact inside initially plane inclined surfaces 218, 218 near the bottom of grommet 200. However, since the dimension "$w_2$" is larger than "$d_4$" as well as "$x_4$", such forcible rotation of clip 100 in either direction will cause forcible, elastic, outward, local deformation of the lower part of grommet 200, i.e., the grommet portion that is deliberately strengthened by the provision of reinforcement ribs 210 on the outside. FIG. 10 illustrates the-initiation of such a rotation of clip 100 in partial perspective view in conjunction with an immediately adjacent cross-section of grommet 200.

However, as can be seen more clearly in FIG. 9, when clip 100 has been rotated through a quarter so that notch 106 is oriented along the axis X—X the principal planes of the clip 100 and grommet 200 are orthogonal to each other, the forcible outward deformation of the lowest part of grommet 200 will generate opposed reaction forces "F" by the grommet on the curved lowest portion of clip 100 tending to force 200. In FIG. 9, this is indicated by arrows "F, F" at the areas of contact between the curved lowest part of pin 100 so oriented and the immediately adjacent surfaces of the grommet. Each reaction force "F" is oriented at an angle "$\theta^*$" which is greater than "$\theta_g$", and has a net upward component acting on clip 100.

In summary, therefore, to engage clip 100 to grommet 200, clip 100 is oriented so that its planar surfaces 124, 124 parallel the width direction of grommet 200 and is then forced into an interference engagement with grommet 200. Then, when an external torque is applied to rotate clip 100 by a quarter turn, forcible deformation in the lower portions of grommet 200 generates a force on the lower curved portion of clip 100 tending to disengage clip 100 and force it out of grommet 200.

As indicated earlier, the use of a washer such as washer 600 is entirely optional, the clip 100 can be particularly sized for a specific application once the thicknesses of the first and second substantially flat parts 400 and 500 are known, and the torque to be applied to clip 100 may be provided by any suitable tool if recess 106 is shaped and sized to receive the same. The clip head may be shaped on the outside, e.g., for engagement by a wrench or even for firm grasping by a pair of pliers.

The exact dimensions of grommet 200 may also be selected at the user's option in light of its intended use. For example, in certain automobiles the cowl structure is covered with a decorative resin grill to provide a pleasing appearance between the hood and the windshield concealing the windshield wiper system and to provide a fresh air intake for the passenger compartment. The grill is located in an area that experiences vibration, temperature cycling, and exposure to water and incidental debris. A resin grill will expand/contract with variations in temperature, so it is highly advantageous to provide secure attachment with a designed-in tolerance for movement in a specified direction about its nominal position. Furthermore, the grill is also required to keep electrical parts safe from moisture, so that seal feature is particularly advantageous for use under a wise variety of operational circumstances.

Further, by the use of a material such as nylon for grommet 200, and the provision of a deformable elastic gasket 300 thereunder, highly effective and inexpensive sealing can be provided and the gasket 300 replaced by a new gasket following disengagement of the clip-in grommet assembly as discussed above. Likewise, should the material of the grommet have suffered physical deterioration over time, the damaged grommet itself can simply be poked out from its initial location and a new grommet pressed into the aperture in the first substantially flat part 400 to provide a replacement grommet.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A fastening system for releasably fastening two objects, comprising:

a grommet formed of an elastic material, having a pocket-like body with an opening leading into an inside space of oblong cross-section, the grommet having an outer surface formed to be retained to a first object and an inside surface comprising a pair of recesses disposed above oppositely tapering surfaces inclined toward each other at a bottom portion of the inside space to a predetermined minimum first separation distance in an unstressed state; and a clip having a head and an elongate shank, the shank having a distal end portion of rectangular varying cross-section defined by intersections between two parallel planes spaced apart by a second separation distance larger than the minimum first separation distance and a pair of plane surfaces inclined toward each other to a distal end of the clip to a third separation distance which is smaller than the minimum first separation distance, and a pair of claws disposed intermediate the head and the distal end portion for engagement with the recesses in the grommet.

2. The fastening system according to claim 1, further comprising:

reinforcement means provided on the outer surface of the grommet for reinforcing the grommet adjacent the bottom portion thereof.

3. The fastening system according to claim 1, wherein: the oblong cross-section of the grommet has a longitudinal dimension larger than a maximum dimension of the cross-section of the shank.

4. The fastening system according to claim 1, wherein: the clip head is formed to be forcibly rotatable.

5. The fastening system according to claim 1, wherein:

the clip comprises a resinous material and has a smooth outer surface free of sharp edges; and the grommet is made of a tough, hard, smoothsurfaced plastics material.

6. The fastening system according to claim 2, wherein:

the oblong cross-section of the grommet has a longitudinal dimension larger than a maximum dimension of the cross-section of the shank;

the clip head is formed to be forcibly rotatable;

the clip is made of a metal and has a smooth outer surface free of sharp edges; and the grommet is made of a tough, hard, smoothsurfaced plastics material.

7. The fastening system according to claim 5, further comprising:

reinforcement means provided on the outer surface of the grommet for reinforcing the grommet adjacent the bottom portion thereof.

8. The fastening system according to claim 7, further comprising:

an annular gasket of a shape and size corresponding to the shape and size of the flange of said grommet.

9. A quick release system for fastening two objects while permitting limited sliding movement therebetween, comprising:

a clip comprising a first material, formed about a longitudinal axis of symmetry contained within a clip principal plane of symmetry, having a head and an elongate shank extending along the axis of symmetry, wherein the head is formed to receive a rotational torque, and wherein the shank has an outer surface defined in part by a pair of parallel plane surfaces which are symmetrically disposed with respect to the axis of symmetry at a separation "$w_1$" and are orthogonal to the clip principal plane of symmetry, the pair of parallel plane surfaces extending from the head to a rounded distal end of the clip, another part of the outer surface of the shank comprising portions of a cylindrical surface of a diameter "$d_1$" about the axis of symmetry, wherein "$l$" is larger than "$w_1$", the shank having a cross-section of reduced diameter "$d_2$" intermediate the head and the distal end to provide a pair of claws extending between the diameters "$d_1$" and "$d_2$" and to a first predetermined distance from the distal end, the shank having a narrowing tapered length "$p_6$" extending from a first level beyond the claws to the rounded distal end, the tapered length "$p_6$" having a rectangular cross-section defined by intersections between the pair of parallel plane surfaces and a pair of side surfaces inclined symmetrically about the clip principal plane of symmetry; and a grommet comprising a second material, having a grommet principal plane of symmetry containing an axis of symmetry, comprising a body having a wall of varying thickness and formed as a packet with a distal rounded closed end and an oblong opening having both a length "c" and a width "$x_1$" which are respectively larger than "$d_1$", the opening being surrounded by an annular flange extending generally transversely away from the axis of symmetry, wherein opposing principal inside wall surfaces of said grommet have portions formed to be oriented generally along the grommet principal plane of symmetry and have recesses therein of predetermined depth and width extending adjacent to an along the flange, wherein the opposing principal inside wall surfaces taper inwardly toward the grommet principal plane of symmetry to a station "$x_2$" which is less than "$d_1$" but greater than "$d_2$" and then continue in parallel to a predetermine notch level and then abruptly widen symmetrically to a separation "$x_3$" and continue in parallel thereafter for a predetermined notch length "$z_4$" to define a grommet notch extending to a point which is at a second predetermined distance "$z_5$" above the lowest point of the inside of the grommet body, said notch length "$z_4$" being longer than an axial length "$p_5$" of the claws of the clip, wherein the principal inside wall surfaces of the grommet then turn sharply inwardly toward the grommet principal plane of symmetry and thereafter continue in planar portions symmetrically inclined about the axis of symmetry to the rounded closed end of the grommet at an inclination of the inside wall surfaces of the grommet corresponding to inclinations of the tapered length of the clip, but with the closest separation between the inclined inside wall surfaces of the grommet being a distance "$x_4$" which is less than "$w_1$" but greater than "$d_4$", and wherein the separation distance "$z_5$" between the grommet notches and the lowest point at the inside of the grommet body is longer than the tapered length "$p_6$" between the clip claws and the clip distal end.

10. The quick release system according to claim 9, wherein the outside surface of the grommet body is provided with a plurality of reinforcement ribs oriented generally in the direction of the principal axis of the grommet and ending in tapered manner at the curved bottom of the grommet.

11. The quick release system according to claim 9, wherein the head of the clip is proved a recess of predetermined shape and size to receive a rotational torque thereat.

12. The quick release system according to claim 9, wherein said clip comprises a resinous material.

13. The quick release system according to claim 9, wherein the grommet is formed of a tough, hard, elastic plastics material having a smooth inside surface.

14. The quick release system according to claim 12, wherein the grommet is formed of a tough, hard, elastic plastics material having a smooth inside surface.

15. The quick release system according to claim 14, wherein the outside surface of the grommet body is provided with a plurality of reinforcement ribs oriented generally in the direction of the principal axis of the grommet and ending in tapered manner at the curved bottom of the grommet.

16. The quick release system according to claim 15, wherein the head of the clip is provided a recess of predetermined shape and size to receive a rotational torque thereat.

17. The quick release system according to claim 9, further comprising:
an annular gasket of a shape and size corresponding to the shape and size of the flange of said grommet.

* * * * *

UNITED STATES PATENT AND TRADEMARK OFFICE
CERTIFICATE OF CORRECTION

PATENT NO. : 5,222,852
DATED : June 29, 1993
INVENTOR(S) : Mark D. SNYDER

It is certified that error appears in the above-indentified patent and that said Letters Patent is hereby corrected as shown below:

Column 6, line 28, change "vie" to --view--.

Column 7, line 2, change "relationship" to --relationships--;

Column 7, line 29, change "210,21" to --210,210--;

Column 7, line 34, change "curing" to --during--;

Column 7, line 58, change "some" to --sum--.

Column 8, line 58, change "t₃38" to --t₃--.

Column 10, line 40, after "quarter" insert --turn,--;

Column 10, line 46, after "force" insert --clip 100, upward, i.e., so as to "pop" it out of the grommet--.

Column 11, line 18, change "that" to --the--.

Column 12, line 54, change "1" to --d₁--.

Signed and Sealed this

First Day of March, 1994

Attest:

BRUCE LEHMAN

*Attesting Officer*  *Commissioner of Patents and Trademarks*